United States Patent Office 3,435,083
Patented Mar. 25, 1969

3,435,083
PROCESS FOR THE JOINT MANUFACTURE OF 2 - CHLOROBUTADIENE - (1,3) AND 1-CHLOROBUTADIENE-(1,3)
Herbert Baader, Hermulheim, near Cologne, Kurt Sennewald, Knapsack, near Cologne, and Helmut Reis, Hurth, near Cologne, Germany, assignors to Knapsack Aktiengesellschaft, Knapsack, near Cologne, Germany, a corporation of Germany
No Drawing. Filed June 22, 1967, Ser. No. 647,917
Claims priority, application Germany, July 26, 1966, K 59,876
Int. Cl. C07c 17/34
U.S. Cl. 260—655           5 Claims

ABSTRACT OF THE DISCLOSURE 2-chlorobutadiene-(1,3) and 1-chlorobutadiene-(1,3) are prepared jointly by dehydrochlorination of 1,4-dichlorobutane-(2) and/or 3,4-dichlorobutene-(1). The dichlorobutene is heated together with an alkyl or aryl phosphine or a hydrochloride or quaternary phosphonium chloride thereof as the catalyst, to a temperature between 50 and 200° C., and resulting hydrogen chloride and chlorobutadiene-mixture are distilled off in conventional manner.

---

The present invention relates to a process for the joint manufacture of 2-chlorobutadiene-(1,3) and 1-chlorobutadiene-(1,3) by dehydrochlorination of 1,4-dichlorobutene-(2) and/or 3,4-dichlorobutene-(1).

2-chlorobutadiene-(1,3) and 1-chlorobutadiene-(1,3) are widely used in industry as monomers and comonomers and as diene or dienophile components.

Petrochemical products, e.g., butadiene-(1,3), which can be combined additively with chlorine to be transformed into a mixture of 1,4-dichlorobutene-(2) and 3,4-dichlorobutene-(1), are preferably used for the commercial production of these chlorobutadienes. 3,4-dichlorobutene-(1) treated by means of an alkali metal hydroxide produces 2-chlorobutadiene-(1,3), while 1,4-dichlorobutene-(2) produces 1-chlorobutadiene-(1,3) under analogous conditions. It has also been reported that the above dichlorobutenes treated by means of an alcoholic potassium hydroxide solution yield monochlorobutadienes which are accompanied by monovinyl acetylene. The alkali metal chloride formed during these processes is found to be useless therein, and attempts have therefore been made with the object of effecting the dehydrochlorination by thermal and catalytical means. British Patent 975,435, for example, discloses pyrolyzing a corresponding dichlorobutene mixture at a temperature of 400 to 800° C., wherein 1-chlorobutadiene-(1,3) is substantially the only product obtained. However, the dehydrochlorination is accompanied by side-reactions, as a result of the high pyrolysis temperatures used, and the reactors are found in practice to be subject to clogging by resinification and deposition of carbon.

The present invention relates more particularly to a process for the joint manufacture of 2-chlorobutadiene-(1,3) and 1-chlorobutadiene-(1,3) by dehydrochlorination of 1,4-dichlorobutene-(2) and/or 3,4-dichlorobutene-(1), which comprises heating the dichlorobutene together with an alkyl or aryl phosphine or a hydrochloride or quaternary phosphonium chloride thereof as the catalyst, to a temperature between 50 and 200° C. and thereafter distilling off hydrogen chloride and the resulting chlorobutadiene-mixture, in conventional manner. A trialkyl or triaryl phosphine is more especially used as the catalyst. The alkyl phosphines preferably include those which contain 4 to 18 carbon atoms per alkyl group. The catalyst is advantageously used in a proportion of 0.1 to 50 parts by weight, more preferably in a proportion of 0.5 to 15 parts by weight, per 100 parts by weight dichlorobutene.

The following alkyl radicals can be used to serve as the "alkyl" in the alkyl phosphines: n-butyl, isobutyl, n-pentyl, n-hexyl, n-heptyl, n-octyl, n-nonyl, n-decyl, n-undecyl, n-dodecyl (lauryl), palmityl, stearyl and further isomeric and homologous alkyls. The di- and trialkyl phosphines may also contain various alkyl groups. Triphenyl phosphine easy to handle as a result of its good stability to the action of atmospheric oxygen, is the preferred aryl phosphine, but the various tritolyl or trixylyl phosphines can be used as well. The alkyl or aryl phosphines or the hydrochlorides or quaternary phosphonium chlorides thereof act as true catalysts in the process of the present invention, and every catalyst molecule causes a plurality of dichlorobutene molecules to undergo dehydrochlorination. The process of the present invention can be carried out by adding to the reaction mixture no more than a suitable tertiary phosphine, the hydrochlorides and quaternary phosphonium chlorides forming automatically in the presence of hydrogen chloride or dichlorobutene.

1,4-dichlorobutene-(2) (B.P.$_{760}$=152–155° C.; cis-trans-mixture) and/or 3,4-dichlorobutene-(1) (B.P.$_{760}$=115° C.) are mixed with the catalyst and boiled thereafter, for example, under reflux, at atmospheric pressure. The dichlorobutenes give off hydrogen chloride, and 2-chlorobutadiene-(1,3) (B.P.$_{760}$=59.4° C.) and 1-chlorobutadiene-(1,3) (B.P.$_{760}$=68° C.) are obtained.

Hydrogen chloride is removed in gas form at the head of a distillation column. Material refluxed in the column is used to adjust the convenient head temperature, equal, for example, to the boiling range of the monochlorobutadienes. In other words, the quantity of head product removed per unit of time depends essentially on the catalyst activity and the purity of the final product desired to be produced.

In practice, the process of the present invention thus enables monochlorobutadienes to be produced in simple manner at temperatures between 50 and 200° C. and hydrogen chloride to be recovered simultaneously, which can be used again for the production of the starting dichlorobutenes by conventional oxychlorination of butadiene-(1,3).

EXAMPLE

A 500 cc. flask equipped with distillation column and thermometer was charged first with 20 grams triphenyl phosphine and 200 grams dichlorobutenes formed of 85% 1,4-dichlorobutene-(2) and 15% 3,4-dichlorobutene-(1). The reaction mixture was boiled thereafter under reflux and considerable hydrogen chloride was found to escape. The reflux was regulated to maintain the temperature between 60 and 100° C. at the head of the 30 cm. Vigreux-column. 129.1 grams head product formed of 27.5 grams unreacted dichlorobutenes and 101.6 grams monochlorobutadienes, were obtained in the course of 4 hours. The ratio of 2-chlorobutadiene-(1,3) to 1-chlorobutadiene-(1,3) was found to be equal to 40:60.

The dichlorobutene conversion rate was accordingly 86% and the monochlorobutadienes were obtained in a yield of 83.2%, referred to the dichlorobutenes transformed.

We claim:
1. A process for the joint manufacture of 2-chlorobutadiene-(1,3) and 1-chlorobutadiene-(1,3) by dehydrochlorination of at least one member selected from the group consisting of 1,4-dichlorobutene-(2) and 3,4-dichlorobutene-(1), which comprises heating the dichlorobutene together with a catalyst selected from the group consisting of alkyl phosphines, aryl phosphines, the hydrochlorides or quaternary phosphonium chlorides thereof, to a temperature between 50 and 2000° C. and thereafter distilling off resulting hydrogen chloride and chlorobutadienes.

2. The process of claim 1, wherein the catalyst is selected from the group consisting of trialkyl and triaryl phosphines.

3. The process of claim 1, wherein the catalyst is an alkyl phosphine containing 4 to 18 carbon atoms per alkyl group.

4. The process of claim 1, wherein the catalyst is used in a proportion of 0.1 to 50 parts by weight per 100 parts by weight dichlorobutene.

5. The process of claim 4, wherein the catalyst is used in a proportion of 0.5 to 15 parts by weight per 100 parts by weight dichlorobutene.

References Cited

UNITED STATES PATENTS 3,026,360  3/1962  Lachowicz _____ 260—655

BERNARD HELFIN, *Primary Examiner.*

J. A. BOSKA, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,435,083            March 25, 1969

Herbert Baader et al.

It is certified that error appears in the above identified patent and that said Letters Patent are hereby corrected as shown below:

Column 1, line 20, "chlorobutane-(2)" should read -- chlorobutene-(2) --. Column 3, line 1, "2000° C." should read -- 200° C. --.

Signed and sealed this 28th day of April 1970.

(SEAL)
Attest:

Edward M. Fletcher, Jr.            WILLIAM E. SCHUYLER, JR

Attesting Officer            Commissioner of Patents